(12) United States Patent
Zhang et al.

(10) Patent No.: US 12,549,683 B2
(45) Date of Patent: Feb. 10, 2026

(54) VIDEO CONFERENCE IMAGES

(71) Applicant: Hewlett-Packard Development Company, L.P., Spring, TX (US)

(72) Inventors: Peter Siyuan Zhang, Spring, TX (US); Pei Hsuan Li, Taipei (TW); Hsin Chin Lin, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 160 days.

(21) Appl. No.: 18/560,753

(22) PCT Filed: Jun. 8, 2021

(86) PCT No.: PCT/US2021/036380
§ 371 (c)(1),
(2) Date: Nov. 14, 2023

(87) PCT Pub. No.: WO2022/260654
PCT Pub. Date: Dec. 15, 2022

(65) Prior Publication Data
US 2024/0259525 A1 Aug. 1, 2024

(51) Int. Cl.
*H04N 7/15* (2006.01)
*G06T 7/70* (2017.01)
*G06V 10/74* (2022.01)

(52) U.S. Cl.
CPC ............... *H04N 7/15* (2013.01); *G06T 7/70* (2017.01); *G06V 10/761* (2022.01); *G06T 2207/20081* (2013.01); *G06T 2207/30201* (2013.01); *G06V 2201/07* (2022.01)

(58) Field of Classification Search
CPC .......... H04N 7/15; H04N 7/142; H04N 7/147; G06T 7/70; G06T 2207/20081; G06T 2207/30201; G06V 10/761; G06V 2201/07; G06V 40/16; G06V 10/74
See application file for complete search history.

(56) References Cited

U.S. PATENT DOCUMENTS

| | | | |
|---|---|---|---|
| 6,359,647 B1 | 3/2002 | Sengupta et al. | |
| 6,778,171 B1 | 8/2004 | Kikinis | |
| 7,729,600 B2 | 6/2010 | Piersol et al. | |
| 8,941,706 B2 | 1/2015 | Guo et al. | |
| 9,462,230 B1* | 10/2016 | Agrawal | G06Q 50/20 |
| 9,558,555 B2 | 1/2017 | Holz | |
| 9,842,549 B2 | 12/2017 | Musgrave et al. | |
| 2020/0065977 A1 | 2/2020 | Duran | |
| 2020/0184227 A1* | 6/2020 | Felhi | G06V 40/50 |

\* cited by examiner

*Primary Examiner* — Yosef K Laekemariam
(74) *Attorney, Agent, or Firm* — Quarles & Brady LLP (57) ABSTRACT

An example system includes a first image sensor, a second image sensor, and an electronic device. The electronic device includes a controller that is to compare positions of a human face and a non-human object in a first set of images captured by the first image sensor. In addition, the controller is to select a presentation arrangement of the first set of images and a second set of images captured by the second image sensor based on the comparison. Further, the controller is to output the first set of images and the second set of images to a video conferencing application in the selected presentation arrangement.

15 Claims, 7 Drawing Sheets

VIDEO CONFERENCE IMAGES

BACKGROUND

Video conferencing has become an established mode of communication for organizations and individuals. During a video conference, image sensors (e.g., camera) may capture images of people and/or objects that are communicated to other participants of the video conference.

BRIEF DESCRIPTION OF THE DRAWINGS

Various examples will be described below referring to the following figures.

DETAILED DESCRIPTION

Image sensors may be used to capture images of people and/or objects during a video conference. In some circumstances, a user may utilize a plurality of image sensors so that images of both the user's face and an additional object may be shown to the other participants of the video conference. For instance, a user may be presenting or demonstrating an object (e.g., a product, book, component, machine) on the video conference. As a result, the user may use one image sensor to focus on the user's face and may use another image sensor to focus on the object. Under such circumstances, the user may manually designate each image sensor for capturing images of the user's face or the object in the video conferencing application, and may separately adjust image settings in each image sensor for enhancing the display of the intended element (e.g., the face or object). These various selections and adjustments may dissuade many users from attempting to utilize multiple image sensors during a video conference.

Accordingly, examples disclosed herein include systems and methods for automatically determining the intended element of an image sensor during a video conference and then adjusting an output of the images to the video conferencing application based on the determination. In some examples, the systems and methods may determine that a first image sensor is to capture images of the user's face and that a second image sensor is to capture images of a non-human object. Based on this determination, the systems and methods may take action to optimize the presentation of the user's face and object for the video conference (e.g., by adjusting image settings of the image sensors and/or selecting an image presentation arrangement for the video conference). Accordingly, through use of the examples disclosed herein, a user may more intuitively and easily utilize multiple image sensors for showing multiple elements (e.g., a face and an object) during a video conference.

Figure 1:
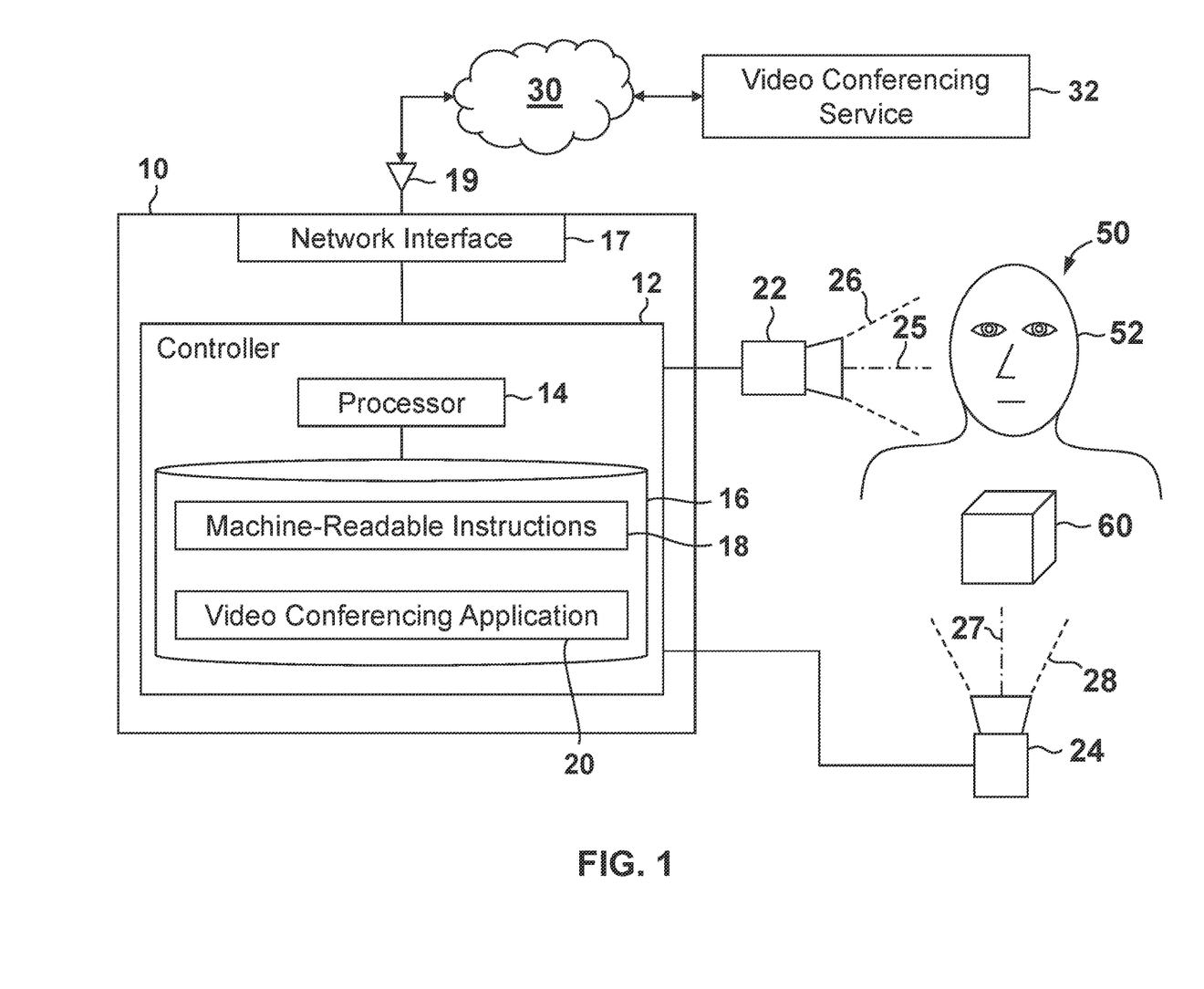
FIG. 1 is a block diagram of an electronic device for conducting a video conference that is coupled to a pair of image sensors according to some examples.

Referring now to FIG. 1, an electronic device 10 for conducting a video conference according to some examples is shown. The electronic device 10 may include any suitable device that may execute machine-readable instructions. In some examples, an electronic device 10 for executing a video conference may comprise, for instance, a computer (e.g., a desktop computer, a laptop computer, a tablet computer, an all-in-one computer), a smartphone, etc. Electronic device 10 includes a controller 12 and a network interface 17. The controller 12 may comprise a processor 14 and a memory 16.

The processor 14 may comprise any suitable processing device, such as a microcontroller, central processing unit (CPU), graphics processing unit (GPU), timing controller (TCON), scaler unit. The processor 14 executes machine-readable instructions (e.g., machine-readable instructions 18) stored on memory 16, thereby causing the processor 14 to perform some or all of the actions attributed herein to the controller 12. In general, processor 14 fetches, decodes, and executes instructions (e.g., machine-readable instructions 18). In addition, processor 14 may also perform other actions, such as, making determinations, detecting conditions or values, etc., and communicating signals. If processor 14 assists another component in performing a function, then processor 14 may be said to cause the component to perform the function.

The memory 16 may comprise volatile storage (e.g., random access memory (RAM)), non-volatile storage (e.g., flash storage, etc.), or combinations of both volatile and non-volatile storage. Data read or written by the processor 14 when executing machine-readable instructions 18 can also be stored on memory 16. Memory 16 may comprise "non-transitory machine-readable medium," where the term "non-transitory" does not encompass transitory propagating signals.

The processor 14 may comprise one processing device or a plurality of processing devices that are distributed within electronic device 10. Likewise, the memory 16 may comprise one memory device or a plurality of memory devices that are distributed within the electronic device 10.

The electronic device 10 may communicate with other devices via a network 30, such as, for instance, the Internet, a telecommunications network, etc. For instance, the network interface 17 may be coupled to an antenna 19 that communicates wirelessly with network 30 (or, more specifically, a node or gateway of network 30). In some examples, network interface 17 may communicate with network 30 via a wired connection (e.g., via Ethernet cable).

In addition, electronic device 10 also includes (or is coupled to) a first image sensor 22 and a second image sensor 24. As used herein, an "image sensor" may refer to any suitable sensor or sensor array that is to detect images in or outside the visible light spectrum (e.g., infrared, ultraviolet, etc.). In some examples, an image sensor (e.g., image sensors 22, 24) may comprise a camera (e.g., a video camera). In addition, in some examples, an image sensor (e.g., image sensors 22, 24) may capture two-dimensional or three-dimensional images. The first image sensor 22 may include a field of view 26 and a line of sight 25, and the second image sensor 24 may include a field of view 28 and a line of sight 27. The line of sight 25 may extend normally away from a center of an outer lens of first image sensor 22, and the line of sight 27 may extend normally away from a center of an outer lens of second image sensor 24. The field of view 26 of first image sensor 22 may be different than the field of view 28 of second image sensor 24. In addition, the line of sight 25 of first image sensor 22 may be oriented at a non-zero angle to the line of sight 27 of second image sensor 24, such that the line of sight 25 is non-parallel to the line of sight 27.

In some examples, the first image sensor 22 may be integrated within a housing (e.g., such as housing 23 shown in FIG. 8) of the electronic device 10. For instance, in some examples, the first image sensor 22 may comprise a user-facing camera of the electronic device 10 (e.g., a user-facing web-cam on a laptop lid, or on a display-side of a tablet computer). In some examples, the second image sensor 24 may be an external image sensor (e.g., that is separate from a housing of the electronic device 10) that is coupled (e.g., via a wireless or wired connection) with the electronic device 10. In some examples, both the first image sensor 22 and the second image sensor 24 may be integrated within a housing of electronic device 10 or may be external image sensors that are separate from a housing of the electronic device 10.

During operations, electronic device 10 may execute a video conference. More specifically, in some examples, the electronic device 10 may receive data for a video conference from a video conferencing service 32 via the network 30. The video conference is executed on electronic device 10 via a video conferencing application 20. The video conferencing application 20 may comprise machine-readable instructions for processing data associated with the video conference. As shown in FIG. 1, the machine-readable instructions for the video conferencing application 20 may be stored in memory 16.

Referring still to FIG. 1, during the video conference, the user 50 may present an object 60 to the other participants. The object 60 may comprise a book, product, machine, component, etc. that the user 50 is displaying, presenting, demonstrating, or discussing on the video conference. For instance, the voice conference executed on electronic device 10 via video conferencing application 20 may comprise a sales presentation by the user 50 during which the user 50 is explaining various features of the object 60 to the other participants (not shown) of the voice conference.

Accordingly, during the video conference, the processor 14 may execute machine-readable instructions 18 to determine whether the image sensors 22, 24 are capturing images of the user's face 52 (which may be more simply referred to herein as "face" 52) and/or the non-human object 60 (which may be more simply referred to herein as an "object" 60). Based on this determination the processor 14 may adjust image parameters and presentation arrangements of the images captured by the image sensors 22, 24 so as to enhance the presentation of the face 52 and/or object 60 during the video conference with a reduced amount of user input (e.g., via menu options and selections).

Referring still to FIG. 1, during operations, processor 14 may receive images captured by both the first image sensor 22 and the second image sensor 24. In particular, the processor 14 (or more generally the controller 12) may receive a first set of images from the first image sensor 22 and a second set of images from the second image sensor 24. The processor 14 may then determine, based on the received images (that is, the first set of images and the second set of images), whether the image sensors 22, 24 are capturing images of face 52 or object 60.

In particular, the processor 14 may use a neural network (e.g., a You Only Look Once (YOLO) object detector, Squeezenet) to recognize face 52 and/or object 60 in the images captured by the image sensors 22, 24. In some examples, the processor 14 may use a machine-learning model, that is other than a neural network, to recognize the face 52 and/or object 60 in the images captured by image sensors 22, 24. After the face 52 and/or object 60 are recognized and located in the images, the processor 14 may then determine whether the face 52 or the object 60 is more prominent in the images. As used herein, the term "prominent," when referring to an element (e.g., face 52, object 60) captured in an image, means the degree to or amount of which the element is the focus or target within the image. Thus, an element that is centered within the image's field of view (e.g., field of view 26, 28) and closer to the image sensor (e.g., image sensor 22, 24) capturing the image may be more prominent than an element that is off-center and farther away.

In some examples, the images captured by the image sensor 22 or the image sensor 24 may include the face 52 but not the object 60 (or vice versa). For instance, in some examples, the processor 14 may recognize (e.g., via the neural network as previously described) the object 60 but not the face 52 or the face 52 but not the object 60 in the images. In this case, the processor 14 may determine that the recognized element (e.g., either the face 52 or the object 60) is the most prominent element in the corresponding images. However, in situations where the processor 14 determines that both the face 52 and object 60 are recognized (e.g., via the neural network as previously described) in the images, then the processor 14 may analyze the images further to determine whether the face 52 or the object 60 is more prominent.

Figure 2:
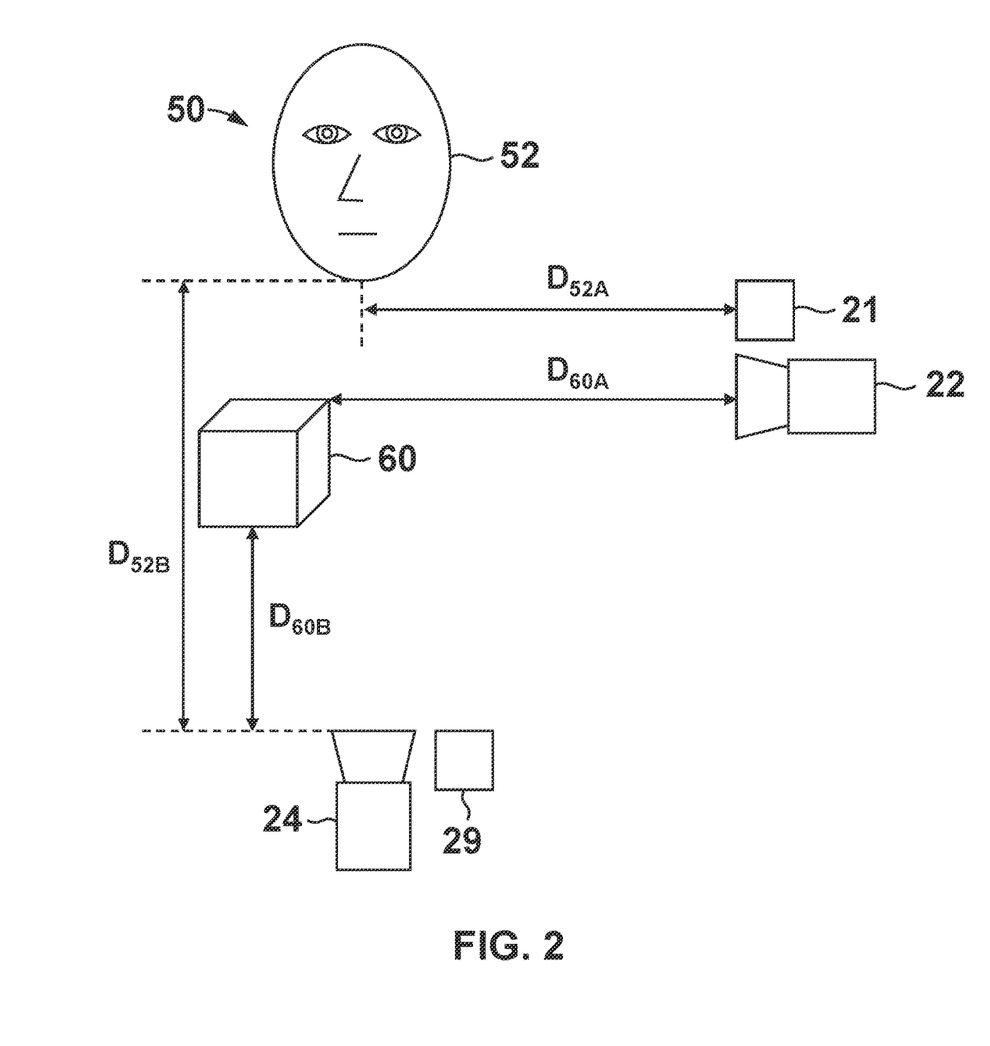
FIG. 2 is a diagram showing distance sensors coupled to the image sensors of FIG. 1 according to some examples.

For instance, referring now to FIGS. 1 and 2, in some examples, the processor 14 may determine whether the face 52 or the object 60 is closer to the image sensor 22, 24 capturing the images when determining whether the face 52 or object 60 is more prominent. In some examples, each image sensor 22, 24 may include or be coupled to a distance sensor 21, 29, respectively that is to measure, estimate, or determine the distance between the image sensor 22, 24 and the face 52 and/or object 60. In some examples, the distance sensors 21, 29 may comprise proximity sensors, time-of-flight sensors, millimeter wave (mmWave) sensors, passive infrared sensors, etc.

During operations, the processor 14 may be coupled to the distance sensors 21, 29 and may receive outputs therefrom. Based on these outputs, the processor 14 may determine whether the face 52 or the object 60 is closer to the image sensor 22, 24 that is capturing the images in question (e.g., the first set of images from the first image sensor 22 or the second set of images from the second image sensor 24). Because the image sensors 22, 24 have different fields of view 26, 28 and different lines of sight 25, 27 as previously described, the distances detected by the distance sensors 21, 29 may be different, even if both image sensors 22, 24 are capturing images of both the face 52 and object 60. For instance, as shown in FIG. 2, the distance sensor 21 may measure or detect distances $D_{52A}$, $D_{60A}$ between the first image sensor 22 and face 52, object 60, respectively, and the distance sensor 29 may measure or detect distances $D_{52B}$, $D_{60B}$ between the second image sensor 24 and face 52, object 60, respectively. For the scenario depicted in FIG. 2, the first image sensor 22 may be closer to the face 52 than the object 60 such that the distance $D_{60A}$ is larger than the distance $D_{52A}$, and the second image sensor 24 may be closer to the object 60 than the face 52 such that the distance $D_{52B}$ may be larger than the distance $D_{60B}$. In this case, based on the distance measured or detected by the distance sensors 21, 29, the processor 14 may determine that the face 52 is more prominent than the object 60 in the images captured by the first image sensor 22 and that the object 60 is more prominent in the images captured by the second image sensor 24.

Figure 3:
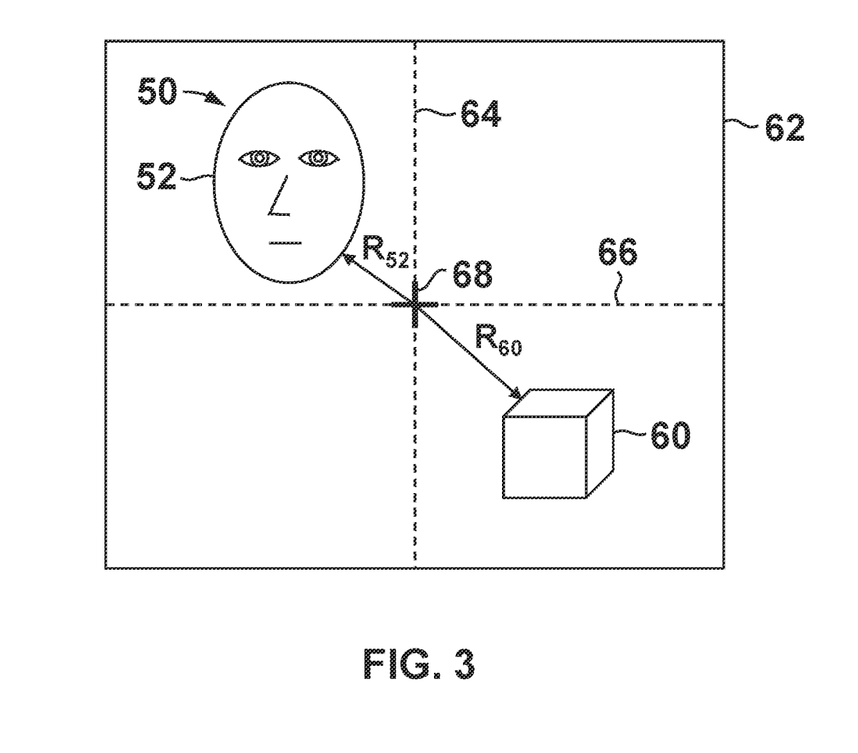
FIG. 3 is a schematic diagram of a field of view of one of the image sensors of FIG. 1 according to some examples.

Referring now to FIGS. 1 and 3, in some instances, processor 14 may determine whether the face 52 or object 60 is more prominent in the images captured by the image sensors 22, 24 based on a relative position of the face 52 or object 60 to the center of the field of view 26, 28, respectively. FIG. 3 depicts an image 62 that may be captured by either first image sensor 22 or second image sensor 24 (and thus may be a representation of the field of view 26 or the field of view 28, respectively). The image 62 may be defined by a vertical axis 64 and a horizontal axis 66 extending perpendicularly to one another. The center 68 of the image 62 may be defined at the intersection of the axes 64, 66 (e.g., or the common midpoint along both the axes 64, 66).

Both the face 52 and the object 60 are visible in the image 62 (e.g., such that the processor 14 may have recognized both the face 52 and object 60 in the image 62 via a neural network or other machine-learning model as previously described). In this case, the face 52 is closer to the center 68 than the object 60. Specifically, the face 52 may be spaced at a first distance $R_{52}$ from center 68 and the object 60 may be spaced at a second distance $R_{60}$ from center 68, and the distance $R_{52}$ may be less than the distance $R_{60}$. In some examples, processor 14 may assess the distances $R_{52}$, $R_{60}$ as a combination of distances from the axes 64, 66 (e.g., such as shown in FIG. 3). In some examples, the processor 14 may consider the distance from one of the axes 64, 66 when assessing whether the face 52 or object 60 is closer to center 68. For instance, in some examples, the processor 14 may determine whether the face 52 or object 60 is closer to the vertical axis 64 (e.g., the processor 14 may compare the components of the vectors of distances $R_{52}$, $R_{60}$ that lie along vertical axis 64), or may determine whether the face 52 or object 60 is closer to horizontal axis 66 (e.g., the processor 14 may compare the components of the vectors of distances $R_{52}$, $R_{60}$ that lie along horizontal axis 66). Based on the distances $R_{52}$, $R_{60}$ (or the components of the distances $R_{52}$, $R_{60}$ lying along the axes 64, 66) the processor 14 may determine, in this instance, that the face 52 is closer than the object 60. Based on this criteria, the processor 14 may determine that the face 52 is more prominent in the image 62 than the object 60.

Referring again to FIG. 1, based on distance (e.g., distances $D_{52A}$, $D_{60A}$, $D_{52B}$, $D_{60B}$ in FIG. 2) and/or the proximity to center (e.g., the distances $R_{52}$, $R_{60}$ in FIG. 3) the processor 14 may determine whether the face 52 or the object 60 is more prominent in the images captured by first image sensor 22, and second image sensor 24. In some instances, the processor 14 may prioritize distance (e.g., distances $D_{52A}$, $D_{60A}$, $D_{52B}$, $D_{60B}$ in FIG. 2) over proximity to center (e.g., the distances $R_{52}$, $R_{60}$ in FIG. 3) such that an element (e.g., face 52, object 60) will be considered the more prominent element in an image captured by an image sensor 22, 24 if the element is closer to the image sensor 22, 24 than other elements in the image, even if the other elements (or some of these other elements) are positioned closer to the center (e.g., center 68 in FIG. 3) of the image. In some instances, the processor 14 may prioritize proximity to center over distance such that an element (e.g., face 52, object 60) will be considered the more prominent element in an image captured by an image sensor 22, 24 if the element is closer to the center of the image than other elements in the image, even if the element is farther away from the image sensor 22, 24 than the other elements (or some of the other elements).

Once the processor 14 recognizes the face 52 and/or object 60 and, if appropriate, determines which of these recognized elements is more prominent in the images captured by the image sensors 22, 24, the processor 14 may then adjust various settings or parameters for capturing the images and/or providing the images to the video conferencing application 20. For instance, in some examples, the processor 14 may select an image presentation arrangement for the images captured by the image sensors 22, 24 based on whether the face 52 or object 60 is more prominent in the images.

Figure 4:
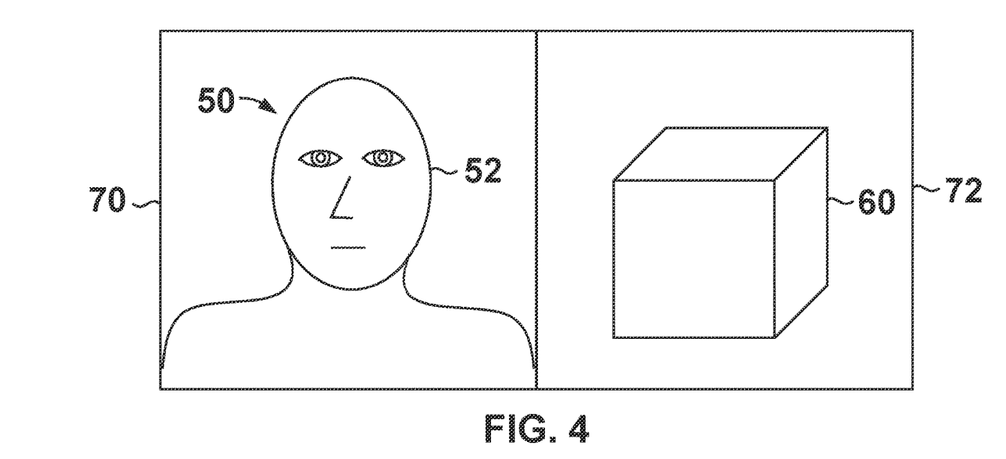
FIGS. 4 and 5 are schematic views of different presentation arrangements for images captured by the image sensors of FIG. 1 according to some examples.
Figure 5:
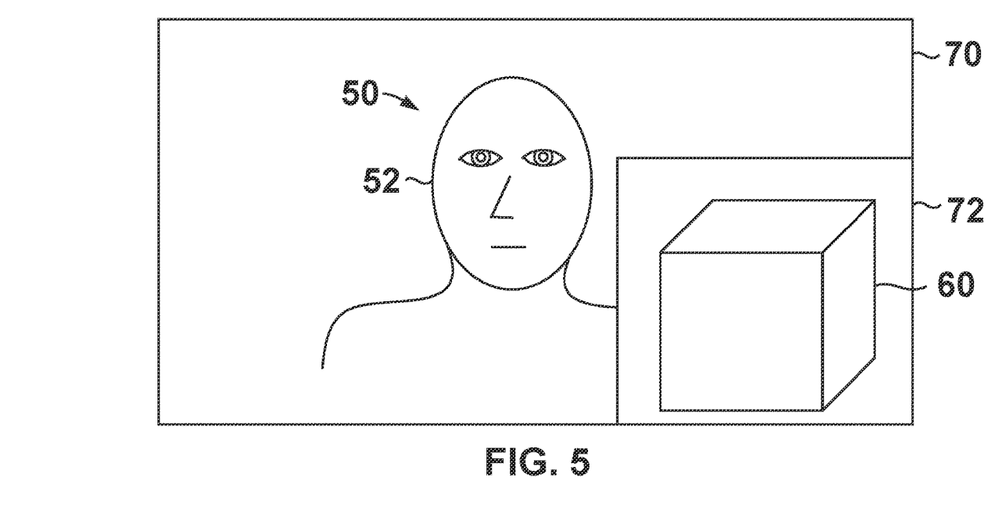

Specifically, referring now to FIG. 4, in some examples, the images captured by the image sensors 22, 24 may be arranged in a side-by-side arrangement whereby the image 70 captured by one of the image sensors 22, 24 is placed beside the image 72 captured by the other of the image sensors 22, 24. Referring now to FIG. 5, in some examples, the images captured by the image sensors 22, 24 may be arranged in a picture-in-picture arrangement whereby the image 72 is embedded within of the image 70 (e.g., at a corner of image 70). The choice between the side-by-side arrangement of FIG. 4 or the picture-in-picture arrangement of FIG. 5 may be based on a user preference.

Referring again to FIG. 1, the processor 14 may, in placing the images 70, 72 in the presentation arrangements of FIGS. 4 and 5, determine that the face 52 is most prominent in the image 70 while the object 60 is more prominent in the image 72 in the manner previously described above. In some examples, the processor 14 may select the placement of the images 70, 72 within the side-by-side or picture-in-picture arrangements of FIGS. 4 and 5, respectively, based on which elements are prominent in the images 70, 72. Specifically, in some examples, the processor 14 may designate the image sensor 22, 24 capturing images of the face 52 (e.g., such that the face 52 is more prominent than the object 60 in the corresponding images) as the main image sensor for a video conference. As a result, in some examples, the image sensor (e.g., image sensor 22, 24) more prominently capturing the face 52 may be chosen as the main image in the picture-in-picture arrangement of FIG. 5 or the left-hand image in the side-by-side arrangement of FIG. 4. The user 50 may provide preferences (e.g., via a suitable menu selection or other input) to prioritize images in which the face 52 or the object 60 is more prominent, and processor 14 may utilize these preferences for placing the images 70, 72 in a given presentation arrangement for a video conference.

In some examples, the processor 14 may apply adjustments to image settings for the images captured by the image sensors 22, 24 based on whether the face 52 or object 60 is recognized or is more prominent therein. For instance, in some examples, the image settings may comprise settings for better displaying the face 52 or object 60 on the video conference. In some examples, the image settings may comprise focus, contrast, brightness, an image filter, or a combination thereof. In addition, the image settings that are adjusted for the first image sensor 22 may be different for the image settings that are adjusted for the second image sensor 24. For instance, for images in which the face 52 is more prominent, the processor 14 may adjust the brightness, contrast, and/or apply an image filter that best displays the face 52 for the video conference. Likewise, for images in which the object 60 is more prominent, the processor 14 may adjust the brightness, contrast, and/or apply an image filter that best displays the object 60 for the video conference.

In some examples, the processor 14 may apply a filter to blur or block out the background and other elements within the images from an image sensor 22, 24 so as to exclusively present images of the prominent element. For instance, if the processor 14 determines that the object 60 is most prominent (e.g., again based on proximity or distance from the center of the image) in images captured by one of the image sensors 22, 24, the processor 14 may apply a filter to blur or block out all other features (e.g., including the face 52 if present) from the images so that the object 60 is exclusively displayed therein.

In some examples, either the face 52 or the object 60 may be the one element captured by both image sensors 22, 24 (e.g., such that the other of the face 52 or object 60) is not captured. In such an instance, the processor 14 may determine which of the image sensors 22, 24 most prominently displays the face 52 or object 60, and then output the images from the selected image sensor 22, 24 to the video conferencing application 20 as a main video stream. In some examples, the processor 14 may detect or recognize the positions of facial features on the face 52 (e.g., via the neural network or other machine-learning model) and, based on these positions, determine the attention or gaze direction of the face 52. In response to this determination, the processor 14 may select the image sensor 22, 24 toward which the attention or gaze of the face 52 is directed (or more closely directed) and output the images from the selected image sensor 22, 24 to the video conferencing application 20 as a main video stream.

In some examples, images from one of the image sensors 22, 24 may be initially output to video conferencing application 20 so as to show the user's face 52 on a video conference. However, during the video conference, the user 50 may place object 60 in front of the image sensor 22, 24 such that within the field of view 26, 28 of the corresponding image sensor 22, 24, respectively, the face 52 of the user 50 is occluded (e.g., partially occluded or fully occluded). In response, the processor 14 may determine that the object 60 is now the most prominent element in the images, and may determine whether the face 52 is more prominent in the field of view 26, 28 of the other image sensor 22, 24, in which case, the processor 14 may additionally output the images captured by the other image sensor 22, 24 to the video conferencing application 20 to display the face 52 of user 50 during the video conference in addition to the object 60. In particular, the processor 14 may automatically select a presentation arrangement for the images from the image sensors 22, 24 (e.g., the side-by-side presentation arrangement of FIG. 4 or the picture-in-picture arrangement of FIG. 5) so that both the user's face 52 and object 60 are provided to the video conferencing application 20.

In some examples, the processor 14 may output the images captured by the first image sensor 22 and the second image sensor 24 to the video conferencing application 20, as separate signals or as a single, combined signal. When outputting the images captured by the first image sensor 22 and the second image sensor 24 as a combined signal, the combined signal may comprise a selected presentation arrangement (FIGS. 4 and 5) and with any applied image setting adjustments.

Figure 6:
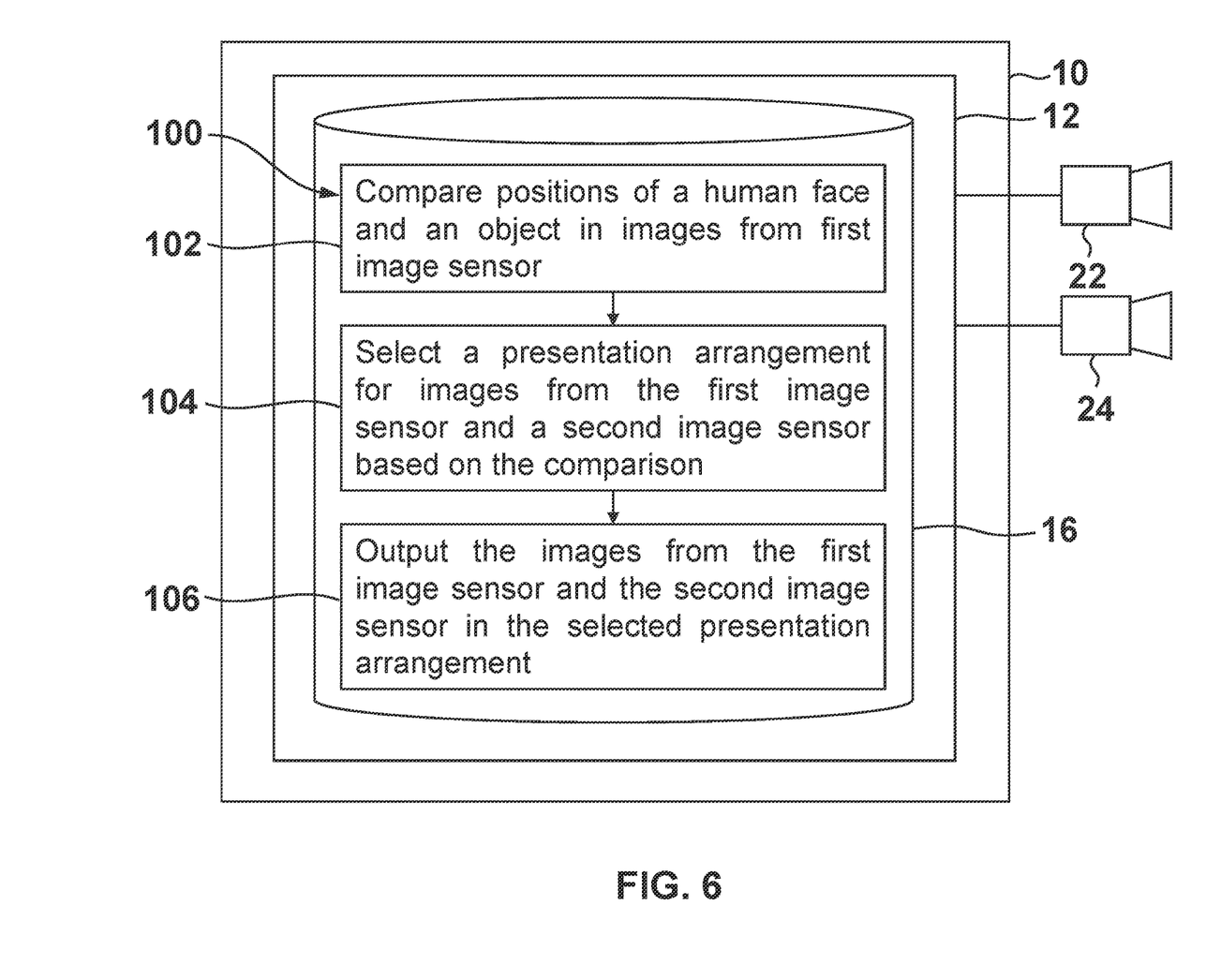
FIGS. 6-8 are block diagrams of machine-readable instructions that may be stored on a memory of the electronic device of FIG. 1 according to some examples.

Referring now to FIG. 6, example machine-readable instructions 100 that may be stored on memory 16 of controller 12 as machine-readable instructions 18 (or a part thereof) are shown. For convenience, and to simplify the drawings, other features of electronic device 10 and controller 12 are not shown in FIG. 6. However, as previously described, the controller 12 may be coupled to a first image sensor 22 and a second image sensor 24. In describing the features of machine-readable instructions 100, continuing reference will also be made to FIGS. 1-3.

The machine-readable instructions 100 may comprise comparing positions of a human face and a non-human object in images from the first image sensor 22 at block 102. For instance, block 102 may comprise comparing a position of face 52 and object 60 in a field of view 26 of first image sensor 22 by comparing the distance between the first image sensor 22 and the face 52 and object 60 via a distance sensor 21 or comparing the proximity of the face 52 and object 60 to a center 68 of the field of view 26 of the first image sensor 22 as previously described.

The machine-readable instructions 100 may also comprise, at block 104, selecting a presentation of arrangement for images from the first image sensor 22 and the second image sensor 24 based on the comparison. The presentation arrangement may comprise an arrangement of the images from the image sensors 22, 24 that may display both the face 52 of the user 50 and the object 60. In particular, in some examples, the presentation arrangement of block 104 may comprise a side-by-side arrangement as shown in FIG. 4, or a picture-in-picture arrangement as shown in FIG. 5.

The machine-readable instructions 100 may also comprise, at block 106, outputting the images from the first image sensor 22 and the second image sensor 24 in the selected presentation arrangement. In some examples, the images from the first image sensor 22 and the second image sensor 24 may be output to a video conferencing application 20 executed on the electronic device 10 as previously described.

Figure 7:
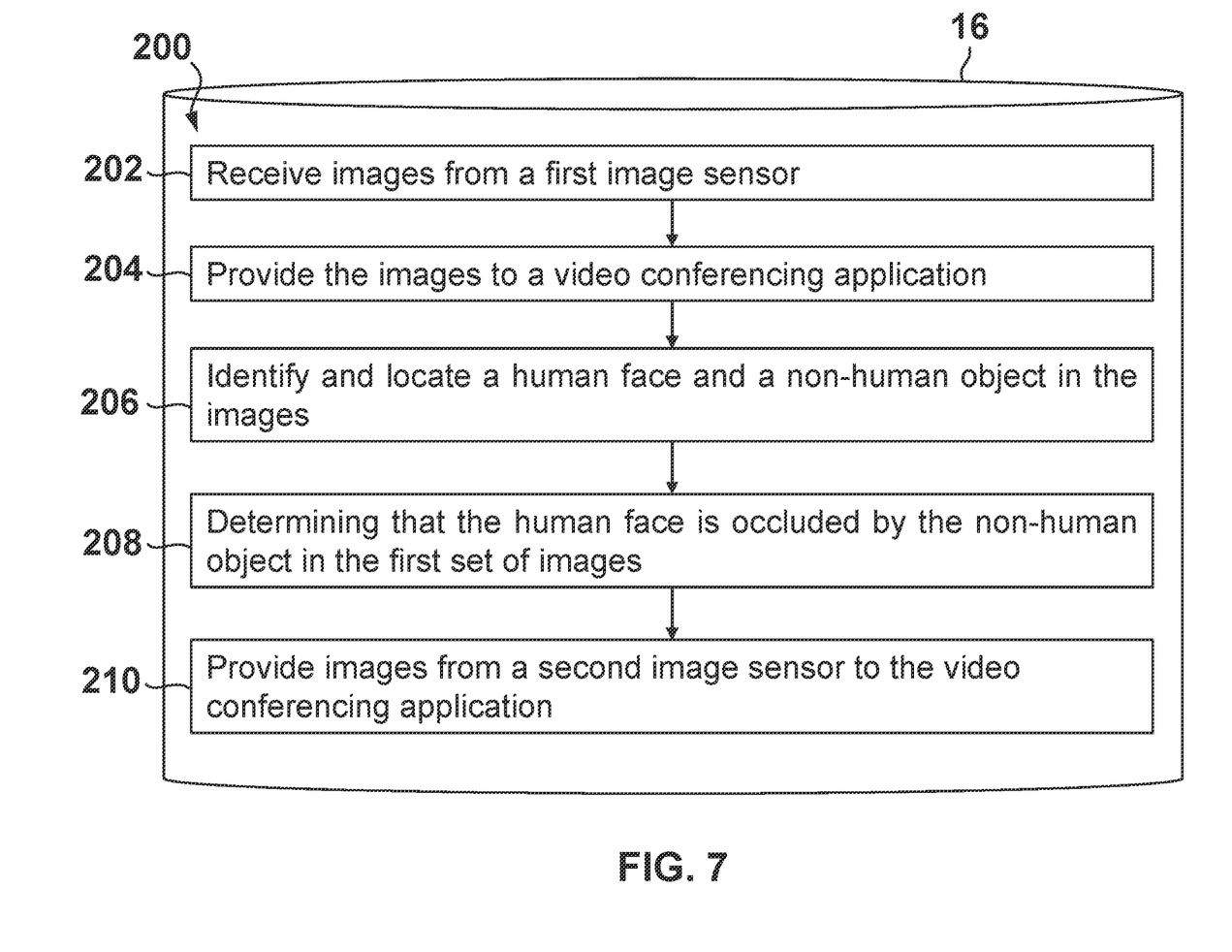

Referring now to FIG. 7, example machine-readable instructions 200 that may be stored on memory 16 as machine-readable instructions 18 (or a part thereof) are shown. In describing the features of machine-readable instructions 200, continuing reference will also be made to FIGS. 1-3.

The machine-readable instructions 200 may comprise receiving images from a first image sensor at block 202, and providing the images from the first image sensor to a video conferencing application at block 204. For instance, as previously described above, the controller 12 may provide images received from the first image sensor 22 to the video conferencing application 20 that may also be stored on memory 16 in some examples.

The machine-readable instructions 200 also include identifying and locating a human face and a non-human object in the images received from the first image sensor at block 206, and determining that the human face is occluded by the non-human object in the images at block 208. For instance, as previously described, the controller 12 (and particularly processor 14) may identify human face 52 and non-human object 60 in images provided from a first image sensor 22 using a neural network, and may determine the location of the face 52 and object 60 based on a distance between the first image sensor 22 and the face 52 and object 60 and a proximity of the face 52 and object 60 from a center 68 of the image. This comparison may show that the object 60 is in front of and is occluding (e.g., partially occluding, fully occluding) the face 52.

The machine-readable instructions 200 also comprise providing the images from the second image sensor to the video conferencing application at block 210. For instance, in some examples, the images form the second image sensor 24 may be provided to the video conferencing application 20 in response to and based on the determination that the human face 52 is occluded by the object 60 at block 208. The images from the second image sensor 24 may be provided to the video conferencing application 20 so as to ensure that images (e.g., un-occluded images) of the face 52 are provided to the video conferencing application 20 in addition to the images of the object 60.

Figure 8:
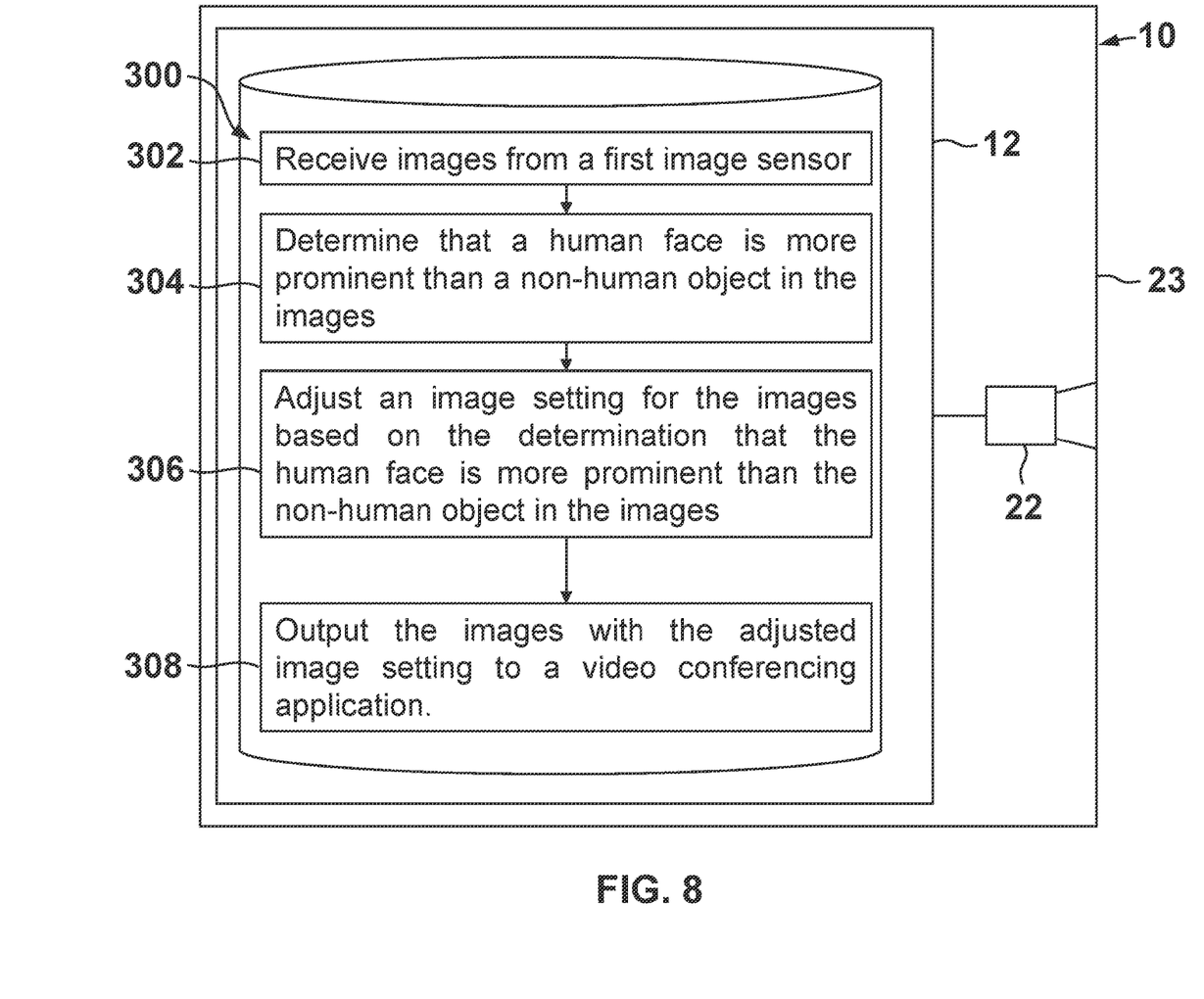

Referring now to FIG. 8, example machine-readable instructions 300 that may be stored on memory 16 of controller 12 as machine-readable instructions 18 (or a part thereof) are shown. For convenience, and to simplify the drawings, other features of electronic device 10 and controller 12 are not shown in FIG. 8. However, as previously described, the controller 12 may be coupled to a first image sensor 22 that is positioned within a housing 23 of electronic device 10. In describing the features of machine-readable instructions 300, continuing reference will also be made to FIGS. 1-3.

Machine-readable instructions 300 include receiving images from a first image sensor at block 302, and determining that a human face is more prominent than a non-human object in the images at block 304. For instance, as previously described, the processor 14 may determine a prominence of a face 52 and object 60 within the image by comparing the relative distance between the first image sensor 22 and the face 52 and object 60 using a distance sensor 21, and the distance between the face 52 and object 60 and a center 68 of the field of view 26 of the first image sensor 22.

Machine-readable instructions 300 include, at block 306, adjusting an image setting for the images based on the determination that the human face is more prominent than the non-human object in the images, and at block 308, outputting the images with the adjusted image setting to a video conferencing application. As previously described, the image setting may comprise focus, contrast, brightness, an image filter, or a combination thereof. In some instances, block 306 may comprise filtering out other elements (e.g., such as the object 60) in the images so as to exclusively show the face 52 in the images from the first image sensor 22.

The examples disclosed herein include systems and methods for automatically determining the intended element of an image sensor during a video conference and then adjusting an output of the images to the video conferencing application based on the determination. Accordingly, through use of the examples disclosed herein, a user may more intuitively and easily utilize multiple image sensors for showing multiple elements (e.g., a face and an object) during a video conference.

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the discussion above and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. In addition, as used herein, the terms "axial" and "axially" generally refer to positions along or parallel to a central or longitudinal axis (e.g., central axis of a body or a port), while the terms "lateral" and "laterally" generally refer to positions located or spaced to the side of the central or longitudinal axis.

As used herein, including in the claims, the word "or" is used in an inclusive manner. For example, "A or B" means any of the following: "A" alone, "B" alone, or both "A" and "B." In addition, when used herein including the claims, the word "generally" or "substantially" means within a range of plus or minus 10% of the stated value.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
   a first image sensor;
   a second image sensor; and
   an electronic device comprising a controller, wherein the controller is to:
      compare positions of a human face and a non-human object in a first set of images captured by the first image sensor;
      determine a first distance between the first image sensor and the human face;
      determine a second distance between the first image sensor and the non-human object;
      determine an occlusion of the human face by the non-human object based on the first distance and the second distance;
      select a presentation arrangement of the first set of images and a second set of images captured by the second image sensor based on the comparison and the occlusion; and
      output the first set of images and the second set of images to a video conferencing application in the selected presentation arrangement.

2. The system of claim 1, wherein the presentation arrangement comprises a picture-in-picture arrangement or a side-by-side arrangement for the first set of images and the second set of images.

3. The system of claim 1, comprising a first distance sensor coupled to the first image sensor,
   wherein the controller is to compare the positions of the human face and non-human object in the first set of images by:
      determining the first distance between the first image sensor and the human face with the first distance sensor;
      determine the second distance between the first image sensor and the non-human object with the first distance sensor; and
      compare the first distance to the second distance.

4. The system of claim 1, wherein the controller is to compare the positions of the human face and non-human object in the first set of images by comparing a relative position of the human face and the non-human object to a center of a field of view of the first image sensor.

5. The system of claim 1, wherein the controller is to identify the human face and the non-human object in the images captured by the first image sensor and the second image sensor using a neural network.

6. A non-transitory machine-readable medium storing instructions, which, when executed by a processor of an electronic device, cause the processor to:
   receive a first set of images from a first image sensor;

provide the first set of images to a video conferencing application;
identify and locate a human face and a non-human object in the first set of images;
determine a first distance between the first image sensor and the human face;
determine a second distance between the first image sensor and the non-human object;
determine that the human face is occluded by the non-human object in the first set of images based on the first distance and the second distance; and
in response to determining that the human face is occluded by the non-human object in the first set of images, provide a second set of images from a second image sensor to the video conferencing application, wherein a field of view of the second image sensor is different than a field of view of the first image sensor.

7. The non-transitory machine-readable medium of claim 6, wherein the instructions, when executed by the processor, cause the processor to:
combine a signal from the first image sensor and a signal from the second image sensor to form a combined signal; and
provide the combined signal to the video conferencing application.

8. The non-transitory machine-readable medium of claim 6, wherein the instructions, when executed by the processor, cause the processor to identify the human face and the non-human object in the first set of images using a neural network.

9. The non-transitory machine-readable medium of claim 6, wherein the first image sensor comprises a first line of sight and the second image sensor comprises a second line of sight, wherein the first line of sight and the second line of sight are non-parallel.

10. An electronic device, comprising:
a housing;
a first image sensor positioned within the housing; and
a controller to:
receive a first set of images from the first image sensor coupled to the electronic device;
determine a first distance between the first image sensor and a human face;
determine a second distance between the first image sensor and a non-human object;
determine that the human face is more prominent than the non-human object in the first set of images based on the first distance and the second distance;
adjust an image setting for the first set of images based on the determination that the human face is more prominent than the non-human object in the first set of images; and
output the first set of images with the adjusted image setting to a video conferencing application.

11. The electronic device of claim 10, wherein the image setting for the first set of images comprises focus, contrast, brightness, an image filter, or a combination thereof.

12. The electronic device of claim 10, wherein the controller is to:
receive a second set of images from a second image sensor coupled to the electronic device;
determine that the non-human object is more prominent than the human face in the second set of images; and
adjust an image setting for the second set of images based on the determination that the non-human object is more prominent than the human face in the second set of images.

13. The electronic device of claim 12, wherein the image setting for the second set of images is different from the image setting for the first set of images.

14. The electronic device of claim 12, wherein the first image sensor comprises a first line of sight and the second image sensor comprises a second line of sight, wherein the first line of sight and the second line of sight are non-parallel.

15. The electronic device of claim 10, wherein the human face is determined to be more prominent than the non-human object in the first set of images based further on a degree to which the human face is in a focus of the first set of images.

* * * * *